US007559487B2

(12) United States Patent
Gressett, Jr. et al.

(10) Patent No.: US 7,559,487 B2
(45) Date of Patent: Jul. 14, 2009

(54) UNIVERSAL DISPENSING SYSTEM FOR AIR ASSISTED EXTRUSION OF LIQUID FILAMENTS

(75) Inventors: Charles A. Gressett, Jr., Norcross, GA (US); David E. Hardy, Duluth, GA (US); John M. Riney, Buford, GA (US); Laurence B. Saidman, Duluth, GA (US); Paul Schmidt, Sugar Hill, GA (US)

(73) Assignee: Nordson Corporation, Westlake, OH (US)

( * ) Notice: Subject to any disclaimer, the term of this patent is extended or adjusted under 35 U.S.C. 154(b) by 1221 days.

(21) Appl. No.: 10/713,451

(22) Filed: Nov. 14, 2003

(65) Prior Publication Data

US 2004/0124251 A1 Jul. 1, 2004

Related U.S. Application Data

(60) Division of application No. 09/999,244, filed on Oct. 31, 2001, now Pat. No. 6,676,038, which is a continuation-in-part of application No. 09/814,614, filed on Mar. 22, 2001, now Pat. No. 6,619,566.

(51) Int. Cl.
*A01G 25/09* (2006.01)

(52) U.S. Cl. .......................... 239/1; 239/296; 239/298; 239/390; 239/549; 239/556; 239/600; 425/182

(58) Field of Classification Search ..................... 239/1, 239/296, 298, 390, 548, 549, 552, 556, 558, 239/567, 568, 583, 600; 425/7, 72.2, 182, 425/185, 186

See application file for complete search history.

(56) References Cited

U.S. PATENT DOCUMENTS

| | | | | |
|---|---|---|---|---|
| 4,613,078 | A | 9/1986 | Marshall | 239/390 |
| 4,969,602 | A | 11/1990 | Scholl | 239/298 |
| 4,983,109 | A | 1/1991 | Miller et al. | 239/298 |
| 5,169,071 | A | 12/1992 | Boger et al. | 239/296 |

(Continued)

FOREIGN PATENT DOCUMENTS

EP 0936000 8/1999

(Continued)

OTHER PUBLICATIONS

European Patent Office, *Partial European Search Report in Corresponding European Application No. 02005595*, Nov. 25, 2005.

(Continued)

*Primary Examiner*—Steven J Ganey
(74) *Attorney, Agent, or Firm*—Wood, Herron & Evans, L.L.P.

(57) ABSTRACT

A system for dispensing liquid material with different configurations of air assisted fiberization or filament movement (e.g., meltblowing, controlled fiberization). In particular, front access for mounting a selected nozzle only requires adjustment of one lever and one fastener. Features of the lever and nozzle allow assisted ejection of the nozzle, even when the nozzle has become adhered to a die body through use. In addition, a nozzle mounting surface of the die body provides a universal interface to the various types of nozzles. An air cavity in the die body and air troughs in selected types of nozzles balance and adjust air flow.

10 Claims, 12 Drawing Sheets

U.S. PATENT DOCUMENTS

| | | | | |
|---|---|---|---|---|
| D354,295 | S | 1/1995 | Walsh et al. | D15/144.1 |
| D354,296 | S | 1/1995 | Walsh | D15/144.1 |
| D365,830 | S | 1/1996 | Hubbard et al. | D15/144.2 |
| 6,056,155 | A | 5/2000 | Byerly et al. | 222/1 |
| 6,149,076 | A | 11/2000 | Riney | 239/135 |
| 6,210,141 | B1 * | 4/2001 | Allen | 425/7 |
| 6,270,019 | B1 | 8/2001 | Reighard | 239/1 |

FOREIGN PATENT DOCUMENTS

| | | |
|---|---|---|
| EP | 1201320 | 5/2002 |

OTHER PUBLICATIONS

European Patent Office, European Patent Search from Corresponding EP Application No. 02005595, Nov. 11, 2005.

* cited by examiner

UNIVERSAL DISPENSING SYSTEM FOR AIR ASSISTED EXTRUSION OF LIQUID FILAMENTS

This application is a divisional of U.S. application Ser. No. 09/999,244, filed on Oct. 31, 2001 now U.S. Pat. No. 6,676,038 which is a continuation-in-part of U.S. application Ser. No. 09/814,614, filed on Mar. 22, 2001 (now U.S. Pat. No. 6,619,566), the disclosures of which are hereby incorporated by reference herein in their entirety.

CROSS-REFERENCE TO RELATED APPLICATIONS

This application is related to the following and commonly-owned applications which were filed on Mar. 22, 2001, namely U.S. Ser. No. 29/138,931, entitled "Discharge Portion of a Liquid Filament Dispensing Valve" (now U.S. Design Pat. No. D456,427 and U.S. Ser. No. 29/138,963, entitled "Liquid Filament Dispensing Nozzle" (now U.S. Design Pat. No. D457,538, the disclosures of which are hereby incorporated by reference herein in their entirety. This application is also related to and commonly-owned applications which were filed on even date herewith, namely U.S. Ser. No. 29/150,970, entitled "Discharge Portion of a Liquid Filament Dispensing Valve" (now U.S. Design Pat. No. D460,092) and U.S. Ser. No. 29/150,969, entitled "Liquid Filament Dispensing Nozzle" (now U.S. Design Pat. No. D461,483), the disclosures of which are hereby incorporated by reference herein in their entirety.

FIELD OF THE INVENTION

The present invention generally relates to dispensing systems for applying a liquid material and, more particularly, for dispensing a filament or filaments of liquid, such as hot melt adhesive, on a substrate.

BACKGROUND OF THE INVENTION

Various liquid dispensing systems use air assisted extrusion nozzles to apply viscous material, such as thermoplastic material, onto a moving substrate. Often times, these systems are used to form nonwoven products. For example, meltblowing systems may be used during the manufacture of products such as diapers, feminine hygiene products and the like. In general, meltblowing systems include a source of liquid thermoplastic material, a source of pressurized process air, and a manifold for distributing the liquid material and process air. A plurality of modules or dispensing valves may be mounted to the manifold for receiving the liquid and process air and dispensing an elongated filament of the liquid material which is attenuated and drawn down by the air before being randomly applied onto the substrate. In general, a meltblowing die tip or nozzle includes a plurality of liquid discharge orifices arranged in a row and a slot on each side of the row of liquid discharge orifices for dispensing the air. Instead of slots, it is also well known to use two rows of air discharge orifices parallel to the row of liquid discharge orifices.

Controlled fiberization dispensing systems also use air assisted extrusion nozzles. However, the pressurized process air in these systems is used to swirl the extruded liquid filament. Conventional swirl nozzles or die tips typically have a central liquid discharge passage surrounded by a plurality of process air discharge passages. The liquid discharge passage is centrally located on a protrusion. A common configuration for the protrusion is conical or frustoconical with the liquid discharge passage opening at the apex. The process air discharge passages are typically disposed at the base of the protrusion. The process air discharge passages are usually arranged in a radially symmetric pattern about the central liquid discharge passage. The process air discharge passages are directed in a generally tangential manner relative to the liquid discharge orifice and are all angled in a clockwise or counterclockwise direction around the central liquid discharge passage.

Another type of air assisted nozzle, referred to herein as a bi-radial nozzle, includes a wedge-shaped member having a pair of side surfaces converging to an apex. A liquid discharge passage extends along an axis through the wedge-shaped member and through the apex. The wedge-shaped member extends in a radially asymmetrical manner around the liquid discharge passage. Four process air discharge passages are positioned at the base of the wedge-shaped member. At least one process air discharge passage is positioned adjacent to each of the side surfaces and each of the process air discharge passages is angled in a compound manner generally toward the liquid discharge passage and offset from the axis of the liquid discharge passage.

These and other types of air-assisted extrusion nozzles generally require periodic maintenance due to accumulation of dust, hardened liquid material, or other reasons. Each dispensing valve may have to be unbolted from the manifold by unscrewing at least two bolts. The nozzle is then removed from the dispensing valve and another nozzle is mounted onto the valve. If necessary, the valve is reattached to the manifold. Consequently, such repair can increase the required shut down time for removal and replacement of valves and nozzles. Removal of the entire dispensing valve with the attached nozzle is generally a requirement when changing between applications (e.g., meltblowing to controlled fiberization).

For these reasons, it is desirable to provide apparatus and methods for quickly changing nozzles on a die assembly without encountering various problems of prior liquid dispensing systems. It is also desirable to provide for easier maintenance and replacement of air-assisted extrusion nozzles.

SUMMARY OF THE INVENTION

Generally, the present invention provides an apparatus for dispensing a filament of liquid which may or may not be assisted by pressurized process air. The apparatus comprises a housing having a liquid supply passage and a nozzle mounting surface which may be disposed within a recess of the housing. A nozzle includes an inlet side positioned adjacent the mounting surface and an outlet side having at least one liquid discharge orifice and, optionally, a plurality of process air discharge passages adjacent the liquid discharge orifice. When properly mounted and aligned against the mounting surface, the liquid discharge orifice and the process air discharge air passages are respectively in fluid communication with the liquid supply passage and the process air supply passage of the housing, if applicable. In one aspect of the invention, a nozzle ejecting lever is pivotally affixed to the housing and pivotally moves from a first position to a second position. In the first position, the nozzle may be mounted adjacent the mounting surface as described above and, as the ejecting lever is moved to the second position, the nozzle is pried away from the mounting surface. This assists in removing nozzles which may be otherwise adhered to the housing due to thermoplastic liquid or other reasons.

In another aspect of the invention, a nozzle positioning lever is pivotally affixed to the housing to move between first and second positions. In the first position the positioning lever allows the nozzle to be mounted in a sealing manner within the housing recess and adjacent the mounting surface. In the second position the positioning lever holds the nozzle in the recess with the process air discharge passages in fluid communication with the process air supply passage and with the liquid discharge orifice in fluid communication with the liquid supply passage. In the preferred embodiment, the positioning lever and the ejecting lever may be one and the same with different portions of the lever performing the position and ejecting functions.

In another aspect of the invention, a clamping lever is pivotally affixed to the housing and operates in conjunction with cam surfaces on the nozzle and the housing to clamp the nozzle within the housing recess. In the preferred embodiment, the positioning lever is used to first position the nozzle within the recess and temporarily hold the nozzle within the recess. The clamping lever is then used to fixedly secure the nozzle within the recess for the duration of the dispensing operation. For nozzle replacement, repair and other maintenance purposes, the clamping lever may be loosened and the positioning and ejecting lever may be used to at least partially remove the nozzle from the recess.

In another embodiment of the invention, a clamping and ejecting lever is provided such that a single lever may be used to clamp and lock a nozzle into place on the housing and also to eject the nozzle from the housing and the nozzle mounting surface. This lever may be pivotally attached to the housing such that one portion thereof is formed with one or more cam surfaces which engage one or more cam surfaces of the nozzle to clamp and lock the nozzle into place on the housing. Another portion of the lever may be used when the lever is rotated in an opposite direction to eject the nozzle. Preferably, the nozzle and the housing each include mating portions which align the nozzle with respect to the housing. In this embodiment, these portions take the form of one or more tabs on the nozzle and one or more aligned slots in the housing adjacent the nozzle mounting surface. The ejecting portion of the lever may engage the tab to provide the prying force necessary to eject the nozzle.

In a further aspect of the invention, the dispensing valve may include an upper air actuating portion having a diaphragm/piston arrangement for opening and closing the valve. This diaphragm may be housed in a chamber having upper and lower pressurized air supply ports. The upper chamber, in this aspect, includes a further port which may or may not be plugged. When plugged, pressurized air in the upper chamber may be used to force the diaphragm and piston assembly downward to close the valve. When the plug is removed, any pressurized air introduced into this upper chamber is immediately exhausted, and a spring return mechanism takes over as the valve closing mechanism.

A plurality of nozzles are provided in a liquid dispensing system in accordance with the invention, with each nozzle configured to discharge a different filament pattern. For example, a first nozzle may be configured to dispense meltblown filaments while a second nozzle may be configured to dispense a swirl filament pattern. Each of the nozzles is constructed to be received in the recess such that the liquid discharge orifice or orifices of the nozzle and the process air discharge passages are respectively in fluid communication with the liquid supply passage and process air supply passage of the housing. Each nozzle is symmetrically configured such that the nozzle may be rotated 180° and still be mountable within the housing recess. In this regard, the nozzle includes cam surfaces on opposite sidewall portions thereof which can each interchangeably engage the cam surface of the clamping lever or a cam surface formed on a wall of the recess.

Various advantages, objectives, and features of the invention will become more readily apparent to those of ordinary skill in the art upon review of the following detailed description of the preferred embodiments, taken in conjunction with the accompanying drawings.

BRIEF DESCRIPTION OF THE DRAWINGS

The accompanying drawings illustrate embodiments of the invention, together with a general description of the invention given above, and the detailed description of the embodiments given below, serve to explain the principles of the invention.

DETAILED DESCRIPTION OF THE PREFERRED EMBODIMENTS

For purposes of this description, words of direction such as "upward", "vertical", "horizontal", "right", "left" and the like are applied in conjunction with the drawings for purposes of clarity. As is well known, liquid dispensing devices may be oriented in substantially any orientation, so these directional words should not be used to imply any particular absolute directions for an apparatus consistent with the invention.

For purposes of simplifying the description of the present invention, the illustrative embodiment will hereinafter be described in relation to certain types of nozzles for distribution of thermoplastic liquid such as hot melt thermoplastic adhesives, but those of ordinary skill in the art will readily appreciate application of the present invention to dispensing of other materials and use other types of nozzles.

Figure 1:
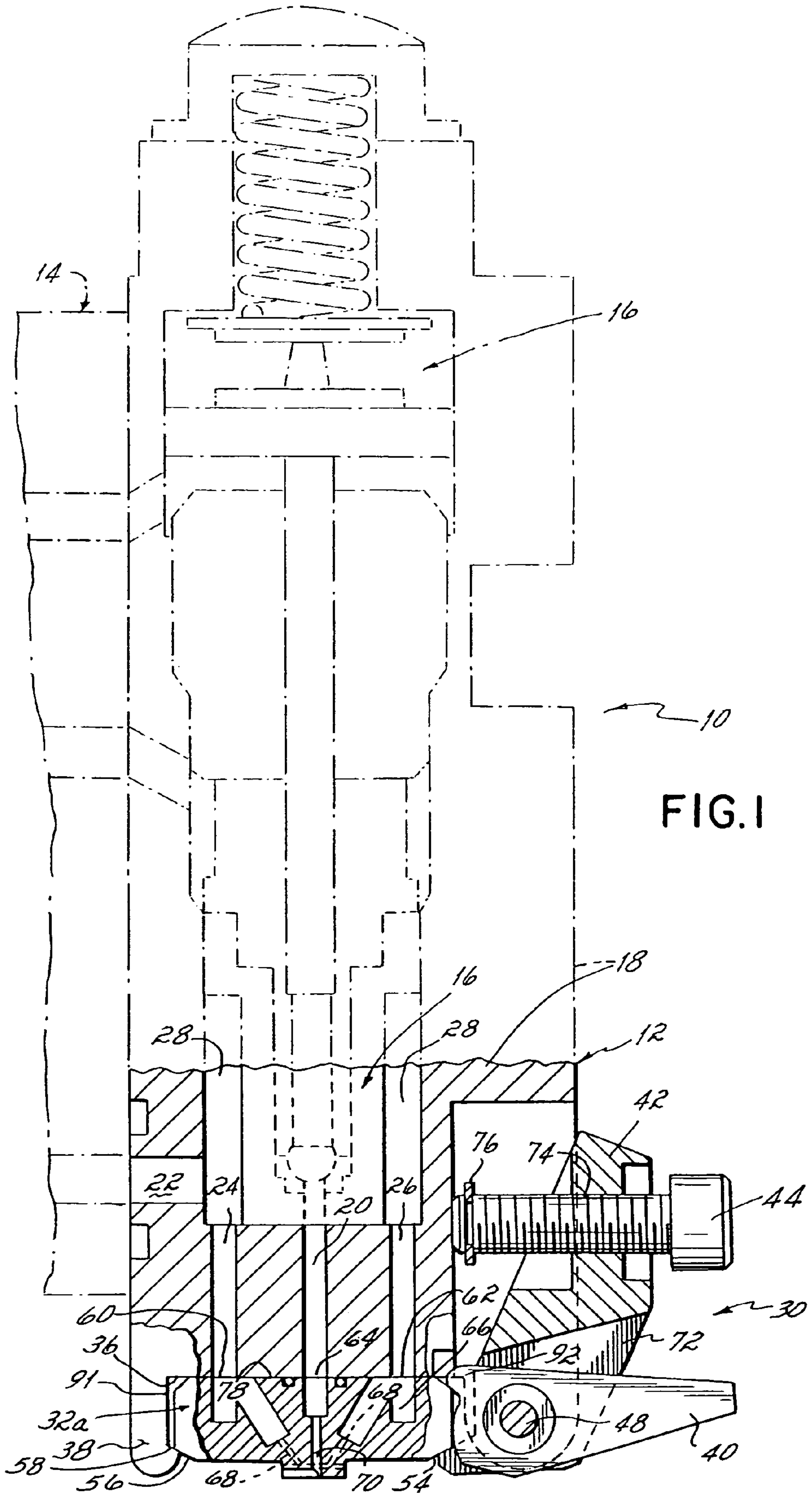
FIG. 1 is a cross-sectional view of a dispensing system configured to hold different types of air assisted extrusion nozzles in accordance with the principles of the present invention for dispensing liquid filaments.
Figure 1A:
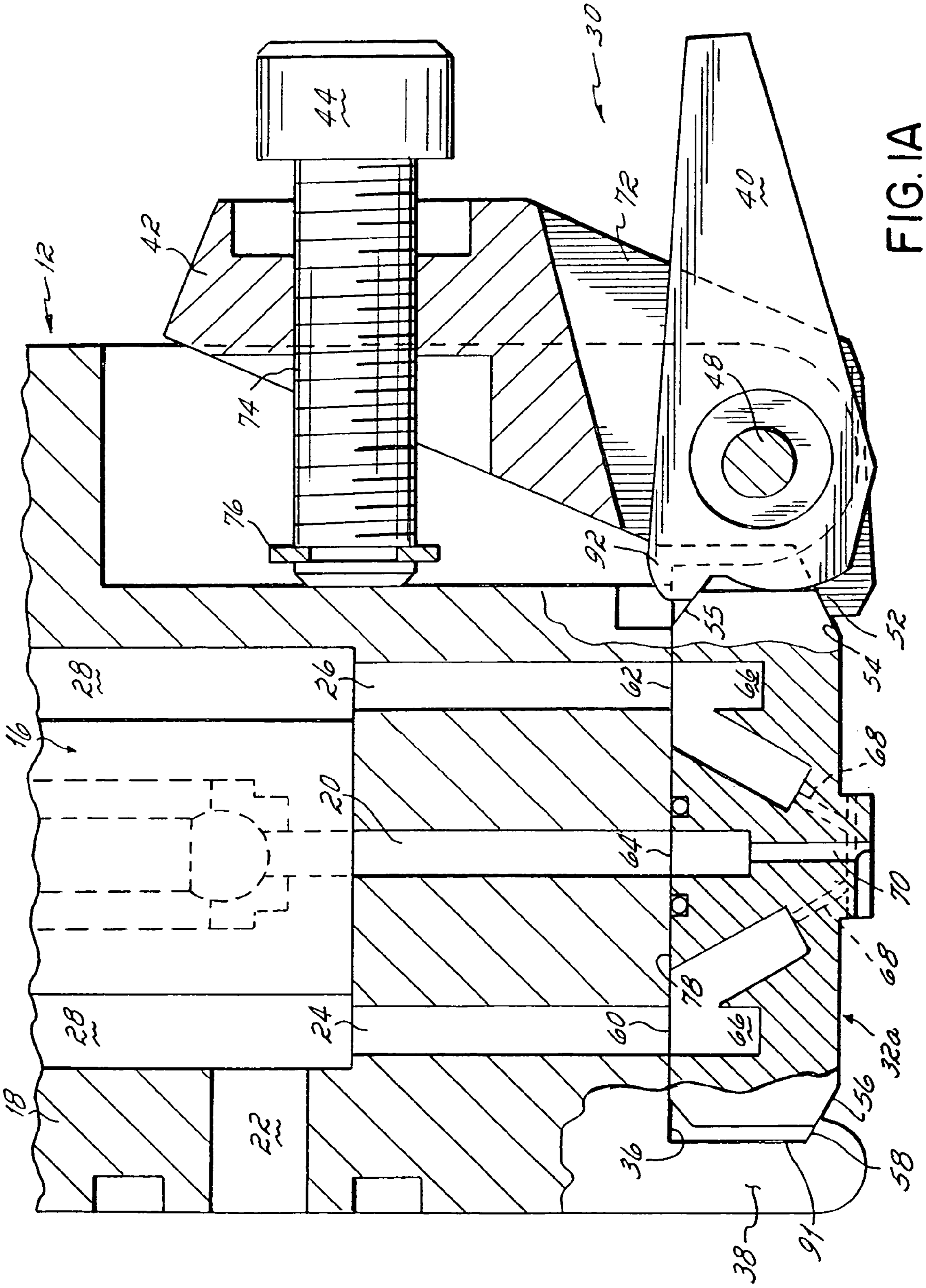
FIG. 1A is an enlarged cross-sectional view of a lower portion of the dispensing valve shown in FIG. 1, illustrating a nozzle assembly.

With reference to the figures, and to FIGS. 1 and 1A in particular, a liquid dispensing system 10 for air assisted extrusion of liquid filaments is depicted as including a dispensing valve or die module 12 and a manifold 14. It will be appreciated that one or more of the die modules 12 may be mounted in side-by-side relationship to the manifold 14 that distributes liquid material and pressurized air to each of the die modules 12. Each dispensing valve or die module 12 includes a pneumatic valve mechanism 16 in a housing 18. The pneumatic valve mechanism 16 is in fluid communication with the manifold 14 to receive the liquid material and to a liquid material flow passage 20 in the housing 18. The valve may alternatively be electrically actuated for controlling flow of the liquid material through the dispensing valve 12. A detailed description of the pneumatic valve mechanism 16 is provided in U.S. Pat. No. 6,056,155, entitled "Liquid Dispensing Device" and assigned to Nordson Corporation, the assignee of this invention. The disclosure of U.S. Pat. No. 6,056,155 is hereby incorporated herein by reference in its entirety.

The housing 18 includes an air supply passage 22 adapted to receive the pressurized air from the manifold 14 and two air flow passages 24, 26 that are parallel to and on each side of the liquid material flow passage 20. The pair of air flow passages 24, 26 allows mounting of different types of nozzles, but does result in different air flow path distances from the air supply passage 22. Thus, an annular air chamber 28 in the housing 18 is in fluid communication with both the air supply passage 22 and the air flow passages 24, 26 for balancing air flow. The different types of nozzles 32*a*, 32*b*, 32*c* benefit from the even distribution of air flow. In the illustrative embodiments, these different types of nozzles 32*a*, 32*b*, 32*c* include meltblowing, controlled fiberization (hereinafter "swirl") and nozzles currently manufactured and sold under the trademark SUMMIT™ by Nordson Corporation, the assignee of the present invention. The SUMMIT™ nozzles are hereinafter referred to as bi-radial nozzles.

Portions of the dispensing valve 12 form a nozzle assembly 30 for selectively and expeditiously mounting various types of air assisted extrusion nozzles 32*a* to the housing 18. In particular, the nozzle assembly 30 includes a clamping structure that allows access for removing and installing a nozzle 32*a* to the dispensing valve 12 from the front side opposite the manifold 14. The nozzle 32*a* is frictionally held in contact with a nozzle mounting surface 36 by the opposition of a fixed member or wall 38 of the housing 18 and a positioning lever 40, which creates a positioning and temporary clamping force parallel to the nozzle mounting surface 36. The temporary support avoids prolonged manual holding of the nozzle 32*a*, which beneficially reduces the amount of time that a user must be in contact with the typically hot surface of the dispensing valve 12 as well as making installation more convenient. This frictional force from the positioning lever 40 advantageously supports the nozzle 32*a* while a pivoting clamping lever 42 locks the nozzle 32*a* to the nozzle mounting surface 36. In particular, a socket head cap screw 44, is threaded inward against housing 18, outwardly pivoting an upper portion 46 of the clamping lever 42 about a pivot pin 48, thereby pivoting a lower portion 50 of the clamping lever 42 under the nozzle 32*a*. Specifically, a cam surface 52 of the lower portion 50 makes inward and upward contact to a forward cam surface 54 of the nozzle 32*a*, with a rearward cam surface 56 of the nozzle 32*a* similarly supported by a cam surface 58 of the fixed member or wall 38.

As will be described in further detail below, different types of air assisted extrusion nozzles 32*a*, 32*b*, 32*c* may be selected for mounting to the nozzle assembly 30. The air inputs 60, 62 and liquid input 64 of each nozzle 32*a*, 32*b*, 32*c* are registered to be in liquid communication respectively with the liquid material flow passage 20 and air flow passages 24, 26 of the housing 18. Pressurized process air flow is diffused by one or more air troughs 66 that provide a tortuous air flow path through nozzle 32*a* and slow down the air flow velocity exiting process air discharge passages 68.

Figure 2:
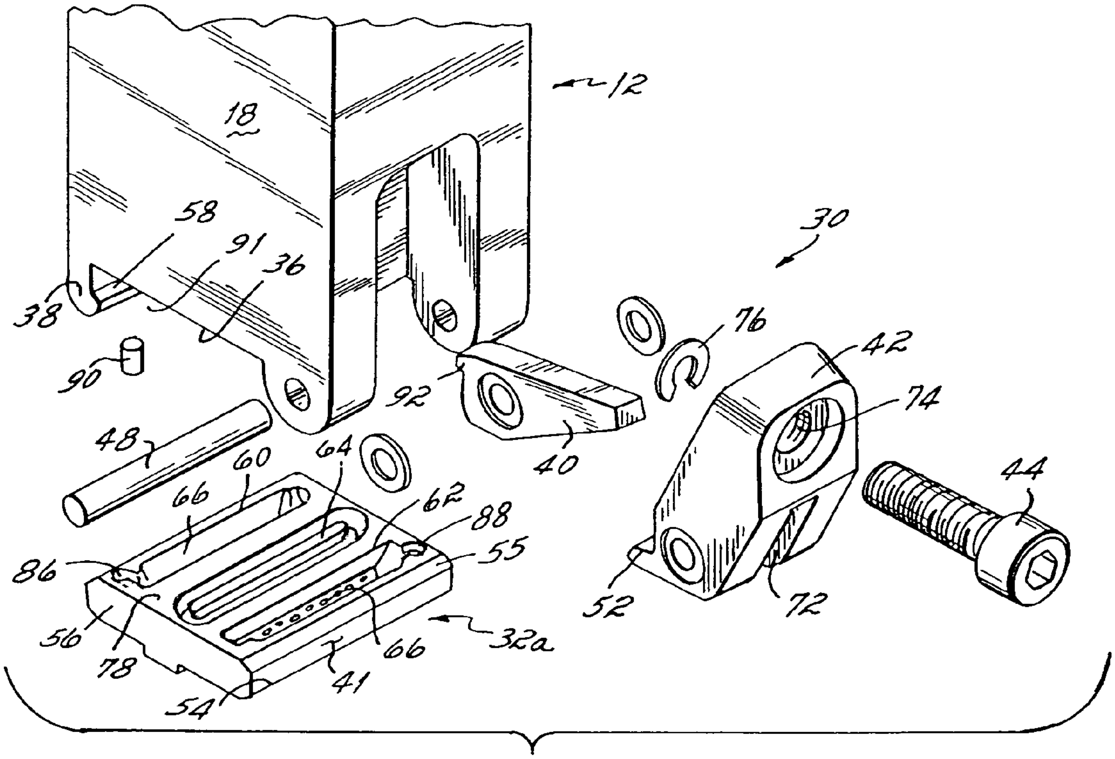
FIG. 2 is a partially disassembled view of the dispensing valve including the nozzle shown in FIG. 1.

With reference to FIG. 2, the dispensing valve 12 is shown with the nozzle 32*a* and nozzle assembly 30 disassembled to illustrate additional features. The positioning lever 40 and clamping lever 42 are pivotally affixed to the housing 18 with the same pivot pin 48. The positioning lever 40 resides within a slot 72 in the clamping lever 42 that allows the positioning lever 40 to pivot upward to an ejection position when the pivoting lever is in an unlocked or loosened state. The cap screw 44 is retained within a threaded hole 74 in the clamping lever 42 by a snap ring 76. An upper surface 78 of the nozzle 32*a* includes a symmetric pattern of air inlets 60, 62 and liquid inlet 64 so that the nozzle 32*a* may be inserted in one of two orientations with one being 180 degrees rotated from the other. The upper surface 78 also includes symmetrically placed alignment recesses 86, 88 registered to receive an alignment pin 90 affixed to the nozzle mounting surface 36 (shown in FIGS. 1 and 1A), that assist in positioning the upper surface 78 relative to the nozzle mounting surface 36.

Figure 3:
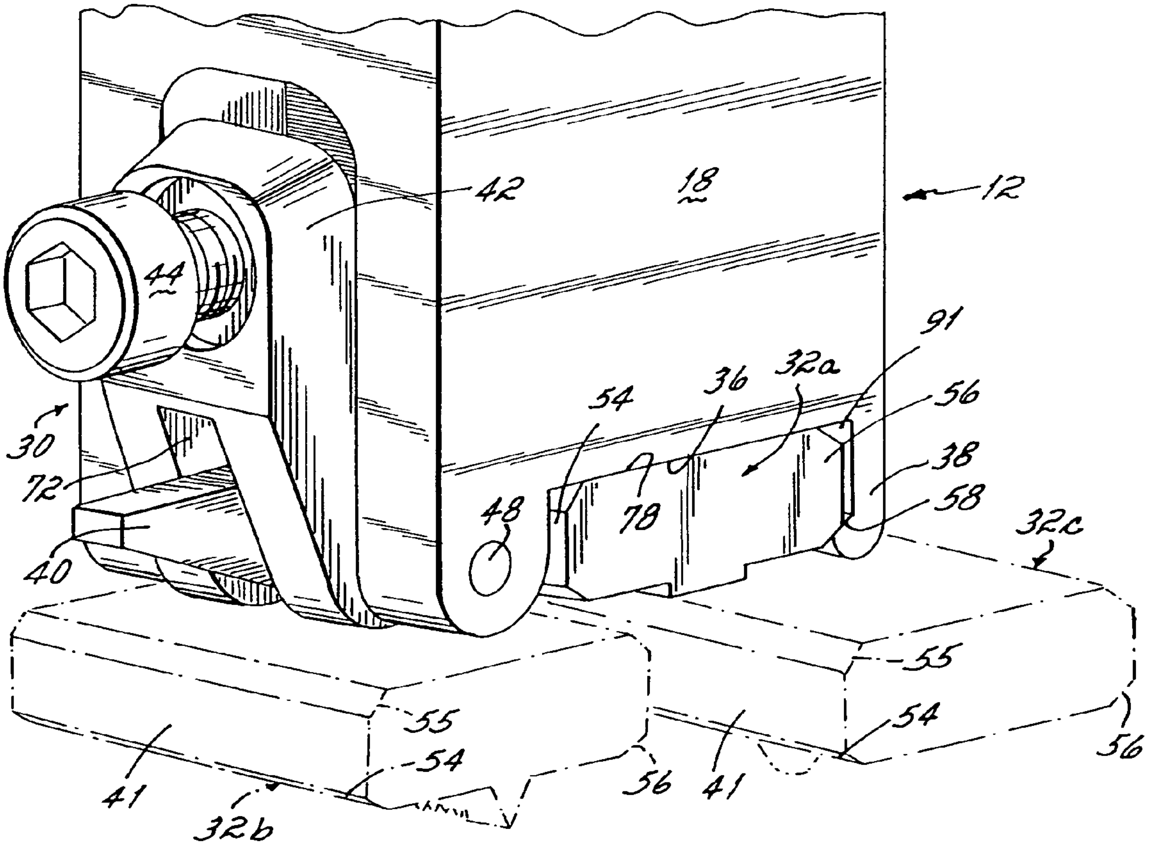
FIG. 3 is perspective side view of the lower portion of the dispensing valve shown in FIG. 1.

With reference to FIG. 3, the nozzle assembly 30 is shown with a bi-radial nozzle 32*a* mounted, as one type of air assisted extrusion. A detailed description of the bi-radial nozzle 32*a* is disclosed in co-pending U.S. Ser. No. 09/571,703, entitled "Module And Nozzle For Dispensing Controlled Patterns Of Liquid Material" and assigned to the common assignee, the disclosure of which is hereby incorporated herein by reference in its entirety. Shown in phantom, a meltblowing nozzle 32*b* and a swirl nozzle 32*c* are shaped similarly to the bi-radial nozzle 32*a* to be alternatively received in a recess 91 of the housing 18.

Figure 4A:
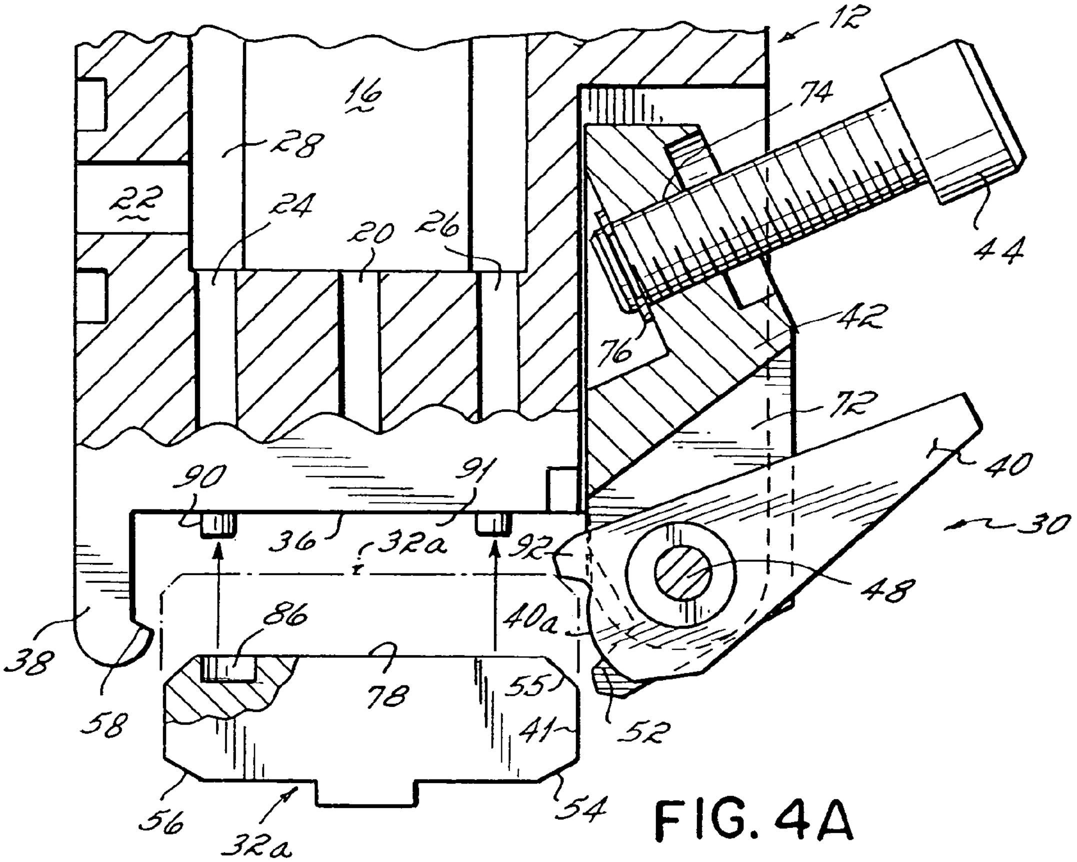
FIG. 4A is a cross-sectional view of the lower portion of the dispensing valve shown in FIG. 1, illustrating insertion of a nozzle, assisted by the positioning and ejecting lever.
Figure 4B:
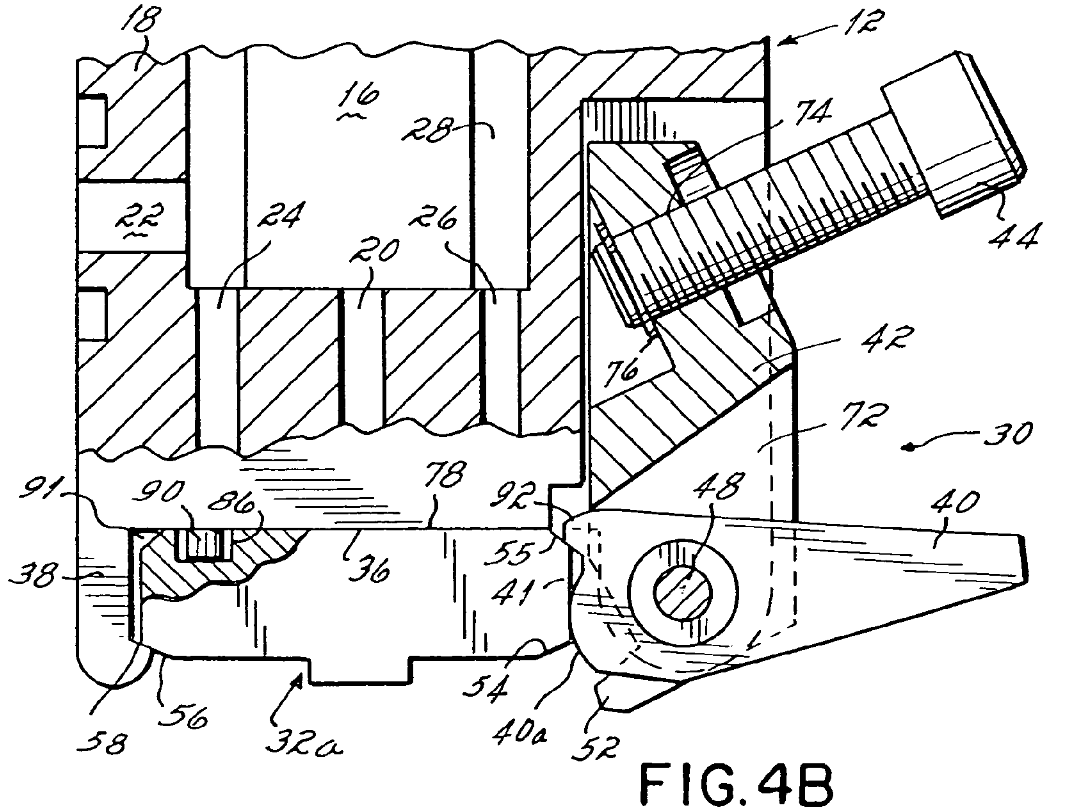
FIG. 4B is a cross-sectional view of the lower portion of the dispensing valve shown in FIG. 1, illustrating the nozzle being frictionally held by the positioning and ejecting lever.
Figure 4C:
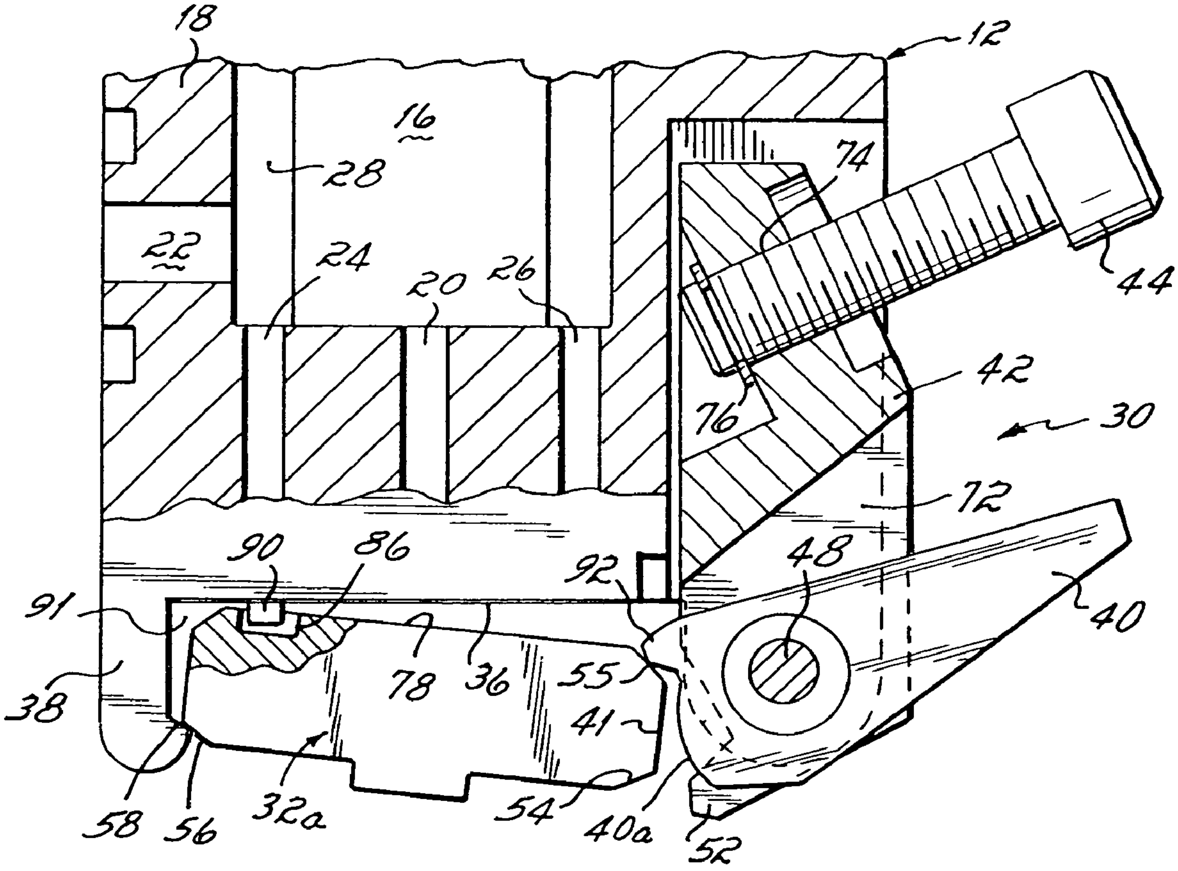
FIG. 4C is a cross-sectional view of the lower portion of the dispensing valve shown in FIG. 1, illustrating ejection of the nozzle, assisted by the positioning and ejecting lever.

With reference to FIGS. 4A-4C, use of the positioning lever 40 to assist in mounting and ejecting a nozzle 32*a* is illustrated with the clamping lever 42 adjusted to the unlocked position by outwardly adjusting the cap screw 44. Thus, with reference to FIG. 4A, the cam surface 52 of the clamping lever 42 does not impede an uninstalled nozzle 32*a* moved upward into proximity to the nozzle mounting surface 36, as depicted by the phantom lines. The rearward alignment recess 86 in the nozzle has sufficient dimensions to register to the alignment pin 90 with the nozzle shifted slightly forward to clear the fixed member or wall 38 which provides a rear boundary for recess 91. If the positioning lever 40 is in the ejection position, further upward movement of the nozzle 32*a* will bear upon a projection 92 of the positioning lever 40, pivoting the positioning lever 40 to an engaged position depicted in FIG. 4B. In particular, a cam surface 40*a* is brought into frictional contact with the forward surface 41 of the nozzle 32*a*. This urges the rearward cam surface 56 into engagement with cam surface 58 of the fixed member or wall 38 thereby forcing nozzle 32*a* against the nozzle mounting surface 36. This temporarily aligns and clamps nozzle 32*a* within recess 91. At this point, the clamping lever 42 may be moved to the locked position by tightening fastener 44 (shown best in FIG. 1A) for the period of use of the dispensing valve 12. This urges cam surface 52 against cam surface 54 thereby urging nozzle 32*a* upwardly into a clamped, sealing engagement against mounting surface 36.

With reference to FIG. 4C, when the nozzle 32*a* requires repair or replacement with another nozzle, the clamping lever 42 is moved to the unlocked position as depicted. Then the positioning lever 40 is used as an ejection lever and is pivoted upward toward the ejection position. As the positioning lever 40 pivots upward, the projection 92 bears downward upon an upper cam surface 55 of the nozzle 32*a* for ejecting the nozzle 32*a*. A prying force thus applied by the positioning lever 40 on the nozzle 32*a* overcomes adhesion of accumulated liquid material during use.

FIGS. 5-12 illustrate the three illustrative types of air assisted extrusion nozzles 32*a*, 32*b*, 32*c* adapted for being universally mounted to the dispensing valve 12.

Figure 6:
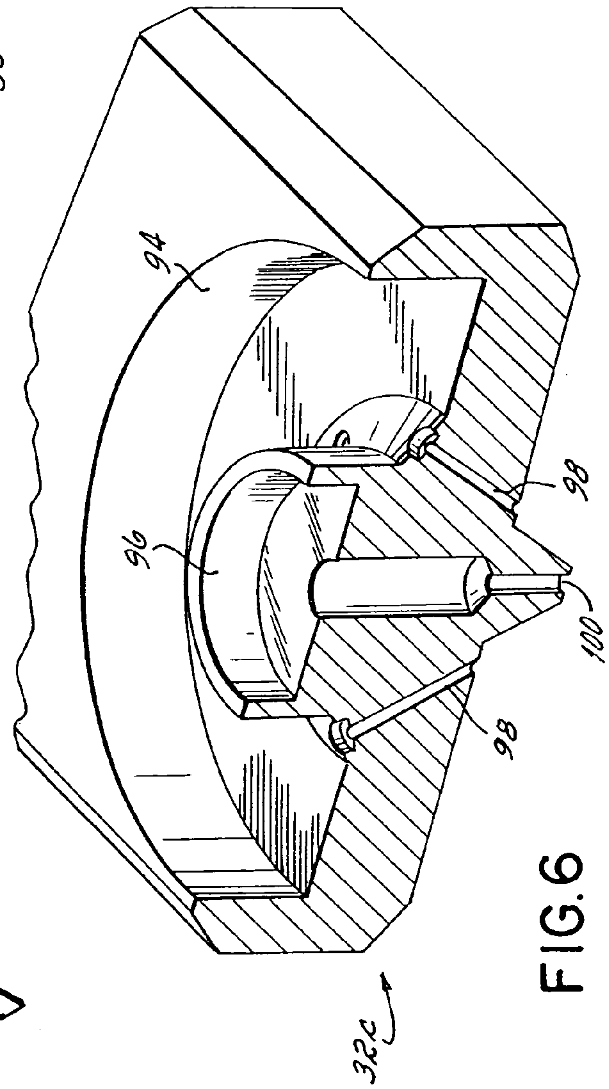
FIG. 6 is a cut-away elevated perspective view of a controlled fiberization nozzle constructed according to the invention.
Figure 7:
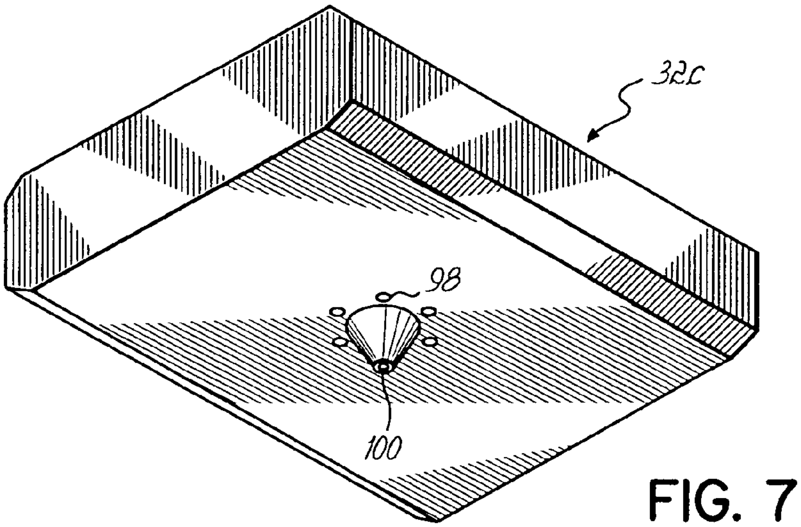
FIG. 7 is a bottom perspective view of the controlled fiberization nozzle of FIG. 6.
Figure 8:
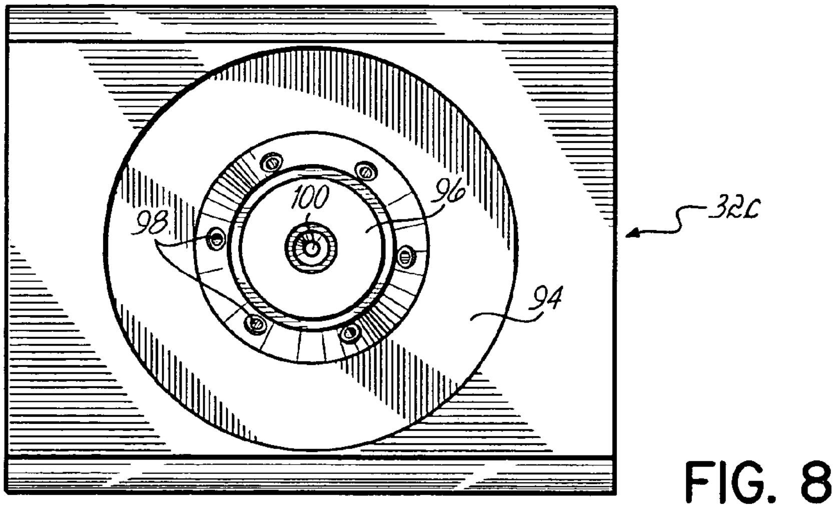
FIG. 8 is a top view of the nozzle of FIGS. 6 and 7.

With reference to FIGS. 6-8, the controlled fiberization nozzle 32*c* has a circular air trough 94 that encompasses a central liquid input 96. Each of the air jets 98 receives pressurized air from the two air flow passages 24, 26 of the housing 18 after being diffused and slowed down in the circular air trough 94 so that none of the air jets 98 directly receives the pressurized air. Consequently, the air flow is more uniform for all air jets 98, as arrayed about a liquid orifice 100 that receives liquid material from the central liquid input 96.

Figure 5:
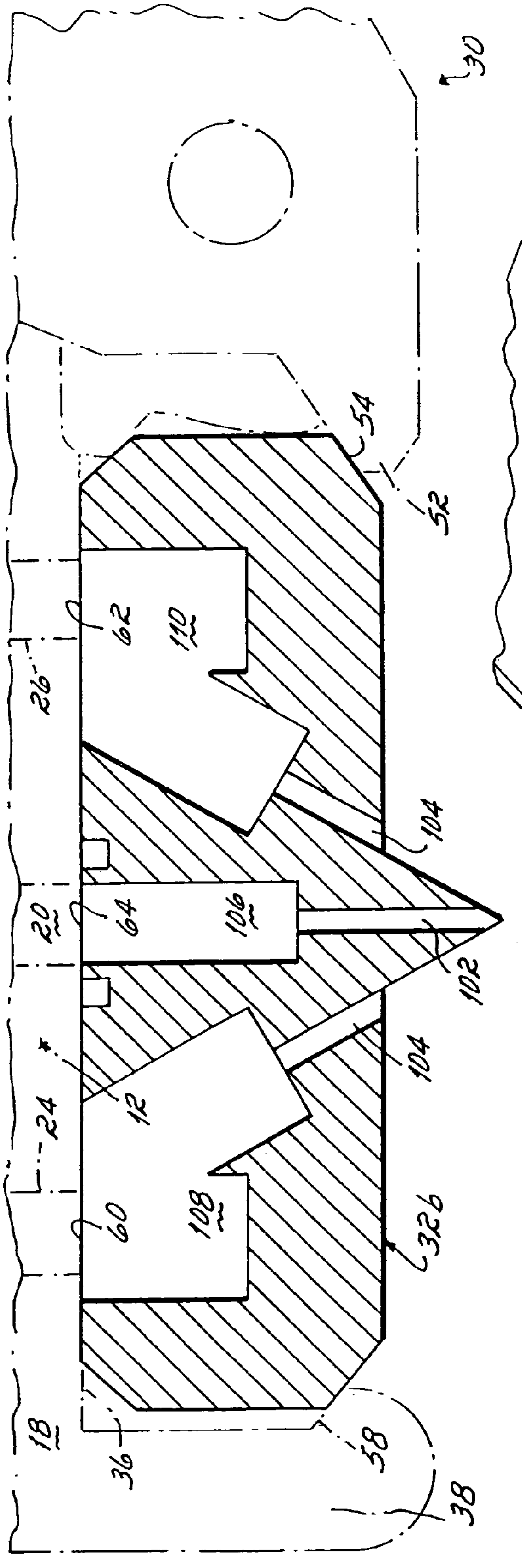
FIG. 5 is an enlarged cross-sectional view of a meltblowing nozzle constructed according to the invention.
Figure 9:
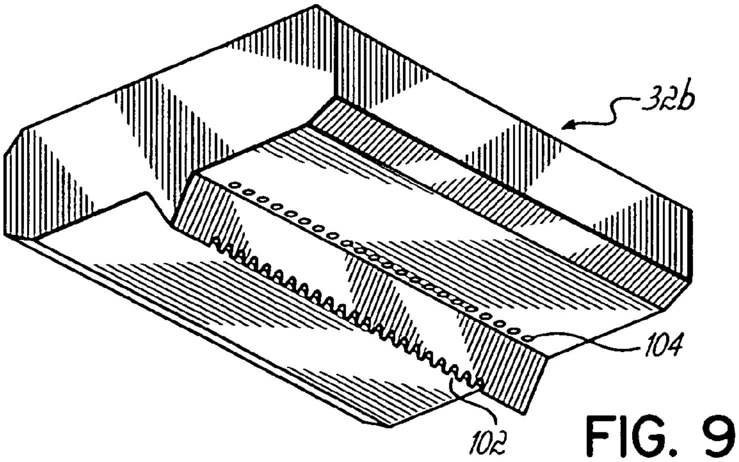
FIG. 9 is a bottom perspective view of the meltblowing nozzle of FIG. 5.
Figure 10:
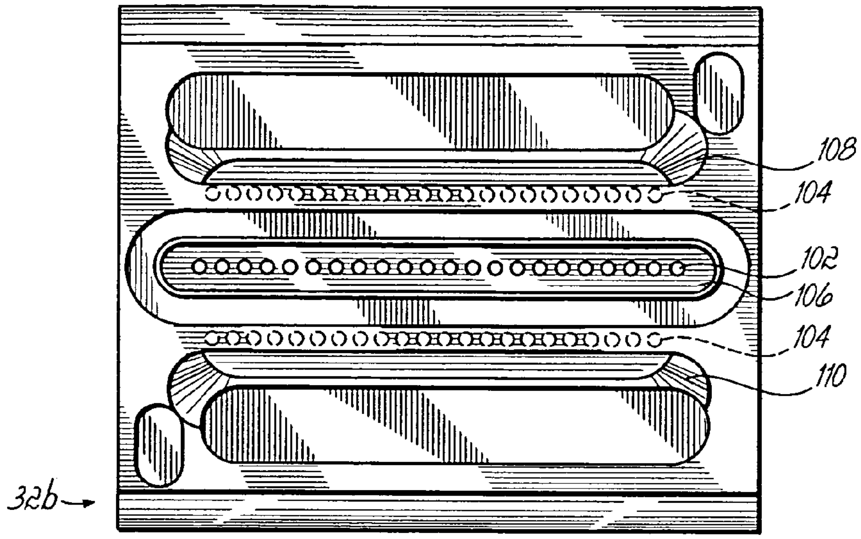
FIG. 10 is a top view of the meltblowing nozzle of FIGS. 5 and 9.

With reference to FIGS. 5, 9 and 10, the meltblowing nozzle 32*b* depicted in FIG. 2 is shown having a row of orifices 102 flanked by rows of air jets 104. Balancing the air flow to these air jets 104 and providing consistent liquid flow to the orifices 102 is provided as shown in FIG. 10. The upper surface 78 of the nozzle 32*b* includes a central elongate slot 106 for communicating the liquid material from the liquid material flow passage 20 of the housing 18 to the length of the row of orifices 102. Two elongate air troughs 108, 110 diffuse and slow down the air flow from each air flow passage 24, 26 respectively to the rows of air jets 104.

Figure 11:
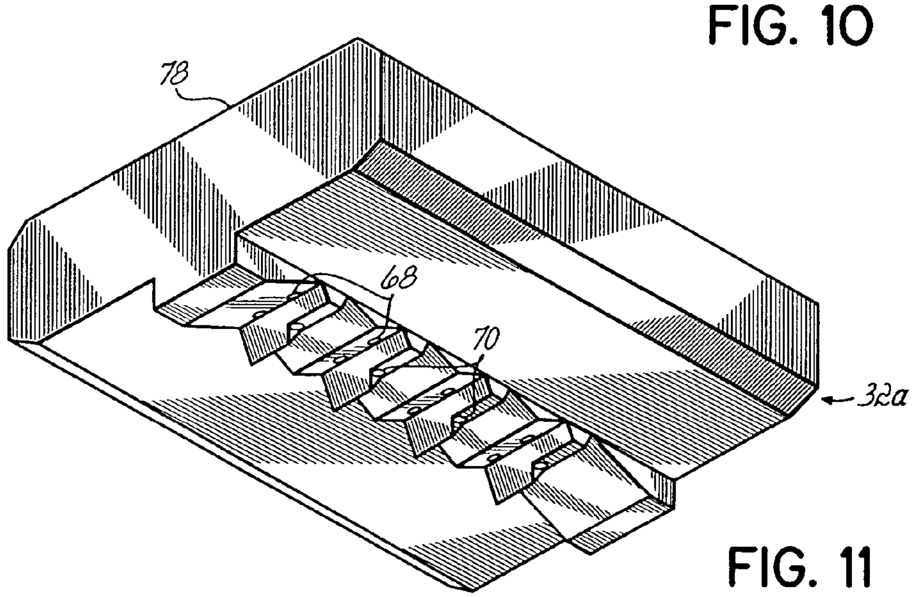
FIG. 11 is a bottom perspective view of a bi-radial nozzle constructed according to the invention.
Figure 12:
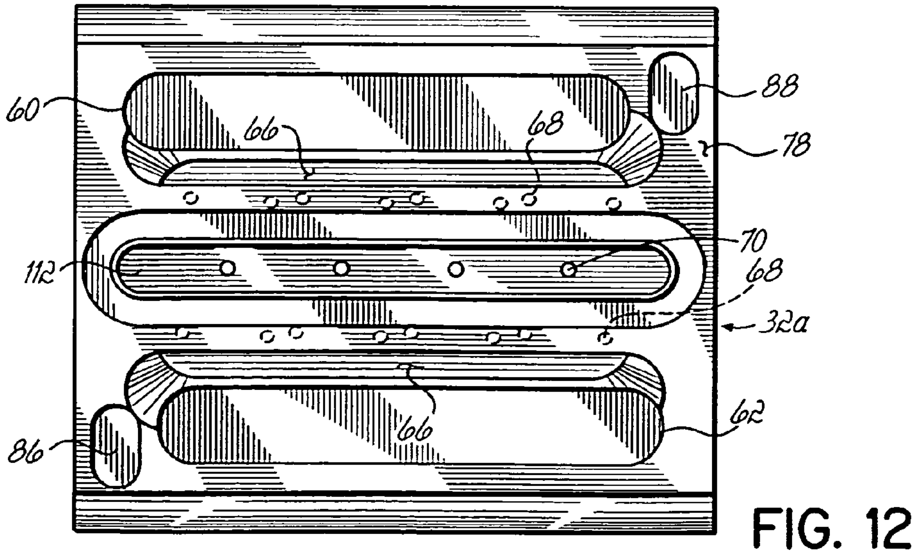
FIG. 12 is a top view of the bi-radial nozzle of FIG. 11.

Similarly, with reference to FIGS. 11 and 12, the bi-radial nozzle 32*a* includes an elongate central slot 112 for providing liquid material to a row of orifices 70 and two elongate air troughs 66 to diffuse and slow down the air flow from each air flow passage 24, 26 respectively to the rows of air jets 68 nonradially positioned about the orifices 70.

By virtue of the foregoing, and in addition to other advantages a nozzle assembly 30 for a dispensing valve 12 of a liquid dispensing system 10 is readily reconfigurable for various types of air assisted extrusion nozzles 32*a*, 32*b*, 32*c* without having to disassemble the dispensing valve 12 from the manifold 14 or having to remove multiple fasteners.

Figure 13:
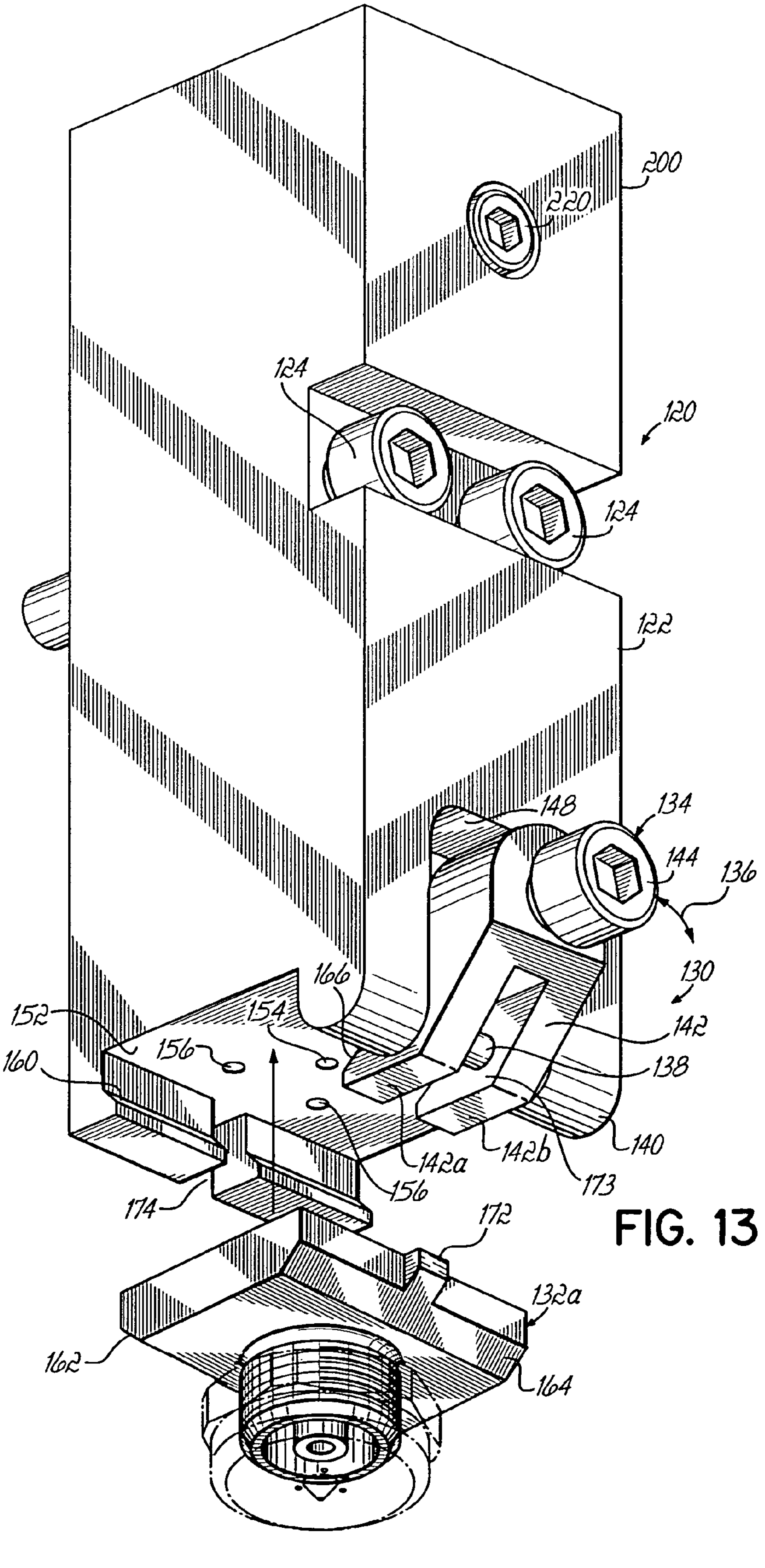
FIG. 13 is an exploded perspective view of an alternative dispensing valve and nozzle in accordance with another embodiment of the invention.

FIG. 13 illustrates an alternative dispensing valve or die module 120 comprised of a valve body 122 which may be fastenable to a suitable support, such as a liquid and air supply manifold (not shown), by respective fasteners 124 which may be engaged with a tool at the front side of valve body 122. In this drawing, the internal valve mechanism has been deleted for clarity. A nozzle assembly 130 at the lower end of valve body 122 includes a nozzle 132*a* and a clamping and ejecting assembly 134 which is pivotally movable in the direction of arrow 136 about a pivot pin 138 affixed to a lower part 140 of valve body 122. Specifically, assembly 134 includes a lever 142 having two clamping members 142*a*, 142*b*. As will be discussed further below, this lever 142 may be used to clamp nozzle 132*a* into place by tightening bolt 144 against a surface 146 (FIG. 14) within a recess 148 of valve body 122. Nozzle 132*a* is insertable within a recess 152 of valve body 122. As with the previous embodiment, suitable liquid and air supply passages are provided in valve body 122 for communicating with like passages in nozzle 132*a*. In this regard, a passage 154 is provided for supplying liquid to nozzle 132*a* and passages 156 (two out of four shown) may be provided for directing process air into nozzle 132*a*. It will be understood by those of ordinary skill that passages 154 and 156 may take other forms and shapes, such as slot-like shapes.

Figure 14:
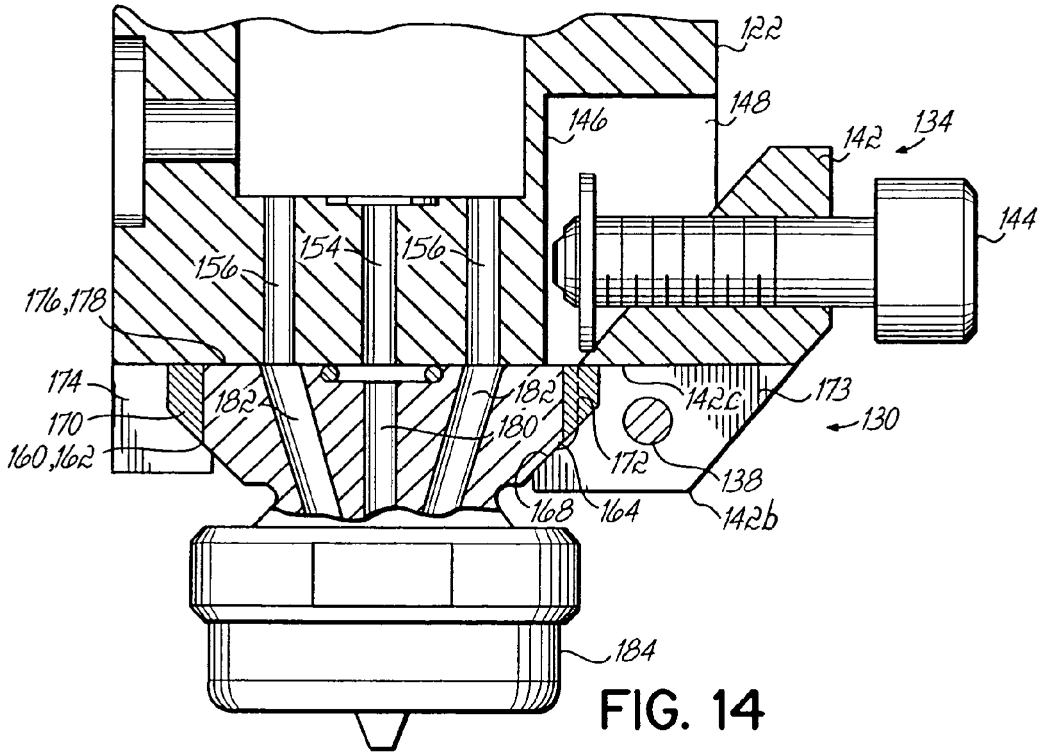
FIG. 14 is a partially fragmented cross sectional view of the discharge portion of the assembled dispensing valve and nozzle shown in FIG. 13.

Referring to FIGS. 13 and 14, a cam surface 160 is formed in recess 152 and a mating cam surface 162 is formed on nozzle 132*a*. On an opposite side, a cam surface 164 is formed on nozzle 132*a* and this cam surface 164 engages with respective cam surfaces 166, 168 on clamp members 142*a*, 142*b*. Tabs 170, 172 on opposite sides of nozzle 132*a* register within respective slots 173, 174 in lever 142 and valve body 122. As shown in FIG. 14, in the assembled condition, respective surfaces 176, 178 of nozzle 132*a* and recess 152 engage such that liquid supply passage 154 communicates with liquid discharge passage 180 and process air passages 156 communicate with process air discharge passages 182 of nozzle 132*a*. Thus, liquid, such as hot melt adhesive, and process air are discharged through a portion 184 of nozzle 132*a* which may, as in this example, be a nozzle portion for emitting a swirled bead of adhesive. Alternatively, a nozzle for extruding a bead or filament of liquid without the assistance of process air may be used.

In operation, nozzle 132*a* is inserted into recess 152 by loosening bolt 144 to such an extent that lever 142 can partially rotate counterclockwise as viewed in FIG. 14. This allows the insertion of nozzle 132*a* with tabs 170, 172 traveling through respective slots 174, 173. Once nozzle 132*a* is situated within recess 152, bolt 144 is tightened against surface 146. This rotates lever clockwise and urges cam surfaces 166, 168 against cam surface 164 and further urges cam surfaces 160, 162 together to clamp respective nozzle and housing mounting surfaces 176, 178 together. To eject nozzle 132*a*, bolt 144 is loosened sufficiently to allow partial rotation of lever 142 in a counterclockwise direction as viewed in FIG. 14. This urges surface portion 142*c* of lever 142 against tab 172 to pry surfaces 176, 178 away from each other and eject nozzle 132*a*.

Figure 15:
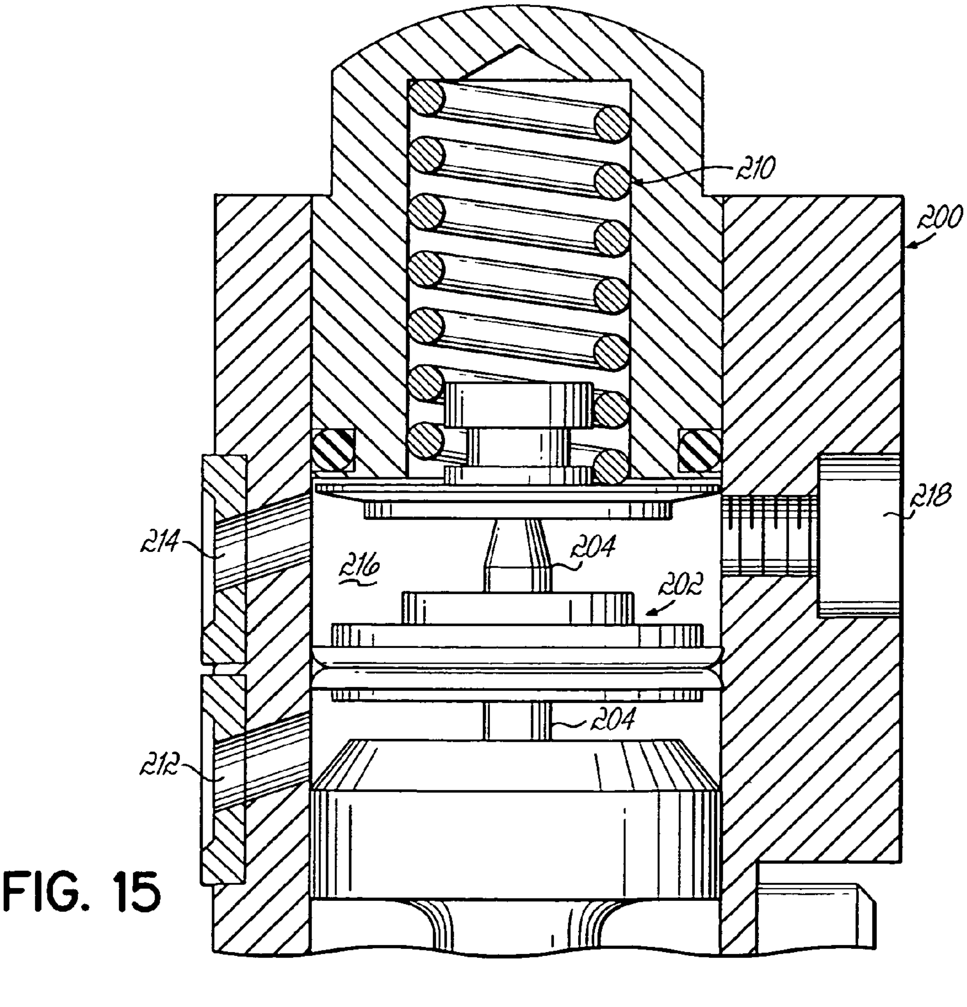
FIG. 15 is a cross sectional view of the upper section of the dispensing valve shown in FIG. 13.

FIG. 15 illustrates an upper actuating portion 200 of dispensing valve 120 including a reciprocating piston assembly 202 having a shaft or rod 204 and a piston or diaphragm member 206. A spring return mechanism 210 bears against a top of the shaft or rod 204 to hold the rod 204 and, therefore, the valve 120 in a normally closed position. An air port 212 is provided for allowing pressurized air to be introduced beneath the piston or diaphragm 206 to lift the shaft or rod 204 and therefore open the valve 120. A second port 214 is provided to communicate with a chamber 216 above the piston or diaphragm 206 to allow the introduction of pressurized air above diaphragm 206 in an "air-over-air" arrangement. In accordance with another aspect of the invention, another port 218 is provided in valve body 122 communicating with the upper chamber 216. This port 218 may receive a threaded plug 220 as shown in FIG. 13. When the threaded plug 220 is removed as shown in FIG. 15, any pressurized air which is introduced through the upper supply port 214 is immediately exhausted through this port 218. In this instance, only the spring assembly 210 will provide the closing force for valve 120.

Figure 16:
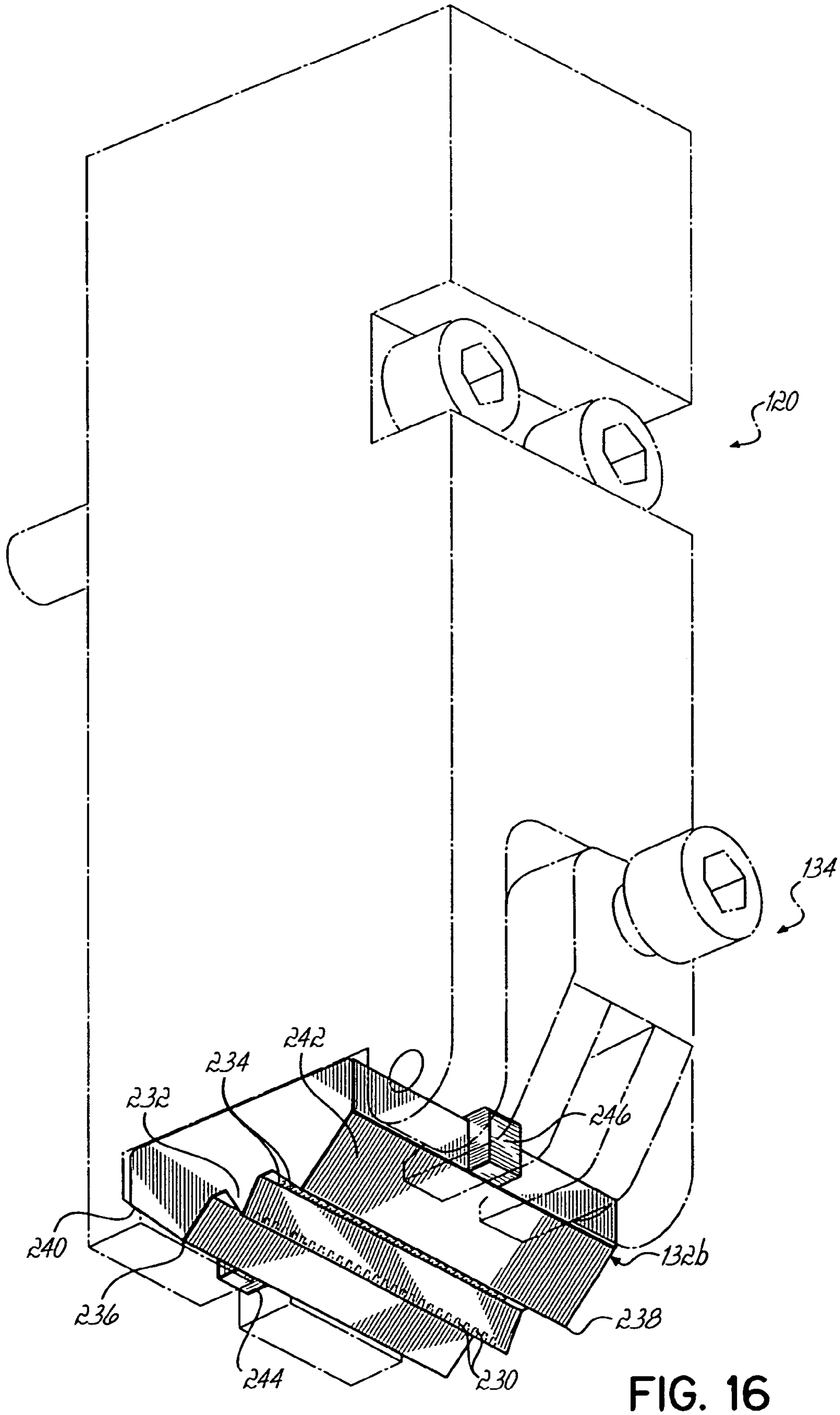
FIG. 16 is a perspective view illustrating one alternative nozzle useful with the dispensing valve of FIG. 13.
Figure 17:
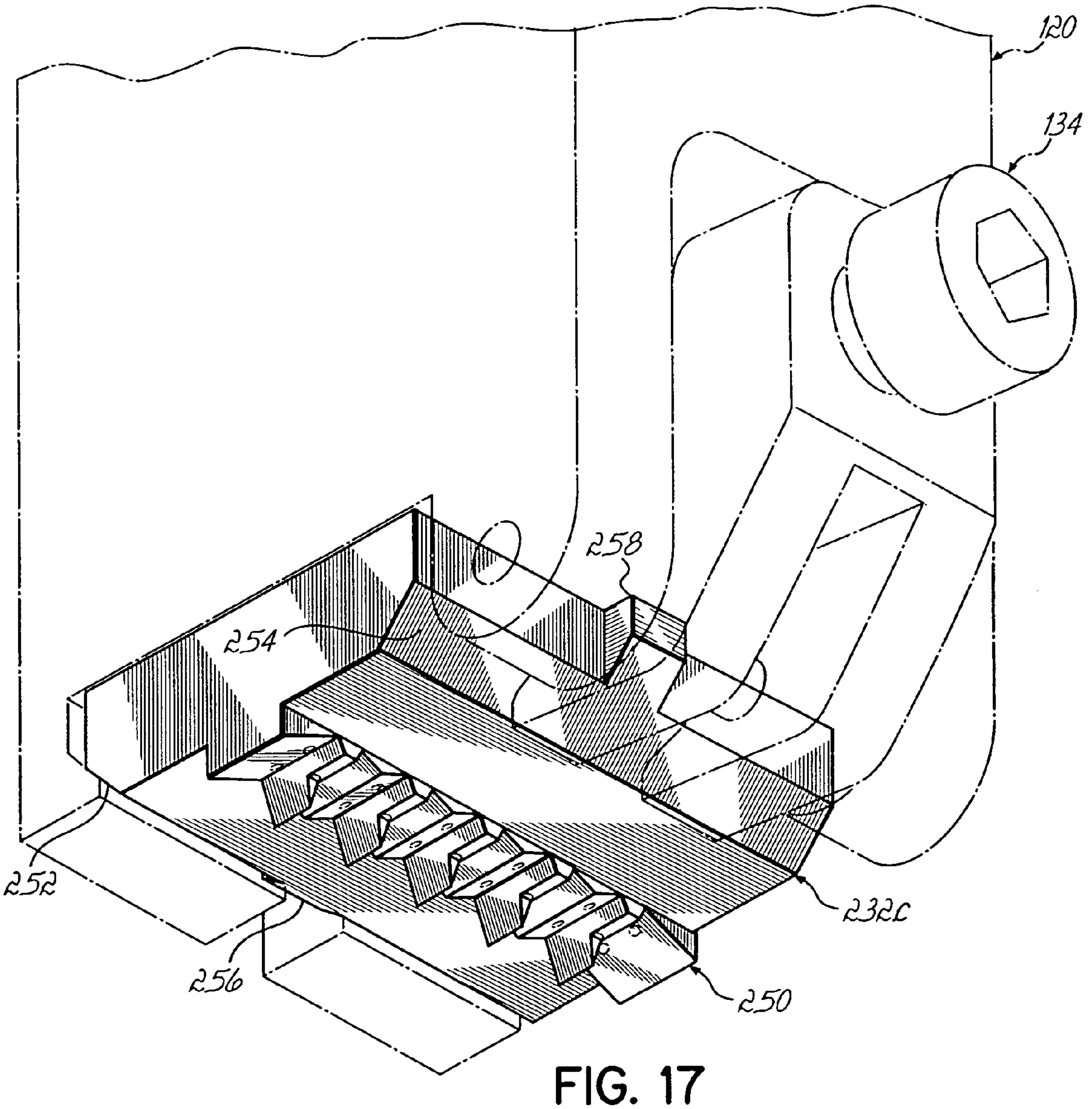
FIG. 17 is another alternative nozzle useful with the dispensing valve shown in FIG. 13.

FIGS. 16 and 17 illustrate two additional alternative nozzles 132*b*, 132*c* which are interchangeable with nozzle 132*a* in dispensing valve 120. Nozzle 132*b* is a meltblowing nozzle having a plurality of liquid discharge orifices 230 on a central crest or apex 232 and two identical series of process air discharge passages 234 (only one series shown) on opposite sides of this central crest 232, as previously described. Two additional crests or apices 236, 238 are positioned on opposite sides of the central crest 232 and extend to a plane beyond a plane which contains the central crest 232. Thus, when nozzle 132*b* is dropped or supported on its discharge side, the two outer crests 236, 238 will directly support the nozzle and protect the central crest 232 from damage which could adversely affect the discharge of liquid from orifices 230. Nozzle 132*b* further includes cam surfaces 240, 242 which preferably form part of the outer crests having apices 236, 238. These cam surfaces 240, 242 operate as previously described with respect to cam surfaces 162, 164 of nozzle 132*a*. In addition, nozzle 132*b* includes tabs 244, 246 which operate identically to tabs 170, 172 described in connection with nozzle 132*a*.

Nozzle 132*c* is a bi-radial nozzle design having a discharge portion 250 as previously described. Nozzle 132*c* further includes cam surfaces 252, 254 which operate identically to cam surfaces 162, 164 and cam surfaces 240, 242 described above. A pair of tabs 256, 258 operate identically to tabs 170, 172 and tabs 244, 246 as previously described.

While the present invention has been illustrated by a description of various preferred embodiments and while these embodiments has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein we claim:

The invention claimed is:

1. A method of attaching and removing a nozzle having a liquid dispensing passage to a dispensing valve having a housing with a nozzle mounting surface, a liquid supply passage opening to the nozzle mounting surface, and a nozzle clamping and ejecting lever coupled to the housing, the method comprising:

positioning the nozzle adjacent to the nozzle mounting surface, pivoting the nozzle clamping and ejecting lever to a first position to clamp the nozzle to the nozzle mounting surface so that the liquid supply passage communicates with the liquid dispensing passage, and pivoting the nozzle clamping and ejecting lever to a second position causing the nozzle clamping and ejecting lever to contact the nozzle and move the nozzle away from the nozzle mounting surface.

2. The method of claim 1, wherein the nozzle further includes an air discharge passage and the housing further comprises an air supply passage opening to said nozzle mounting surface, and pivoting the nozzle clamping and ejecting lever to the first position further comprises:

clamping the nozzle to the nozzle mounting surface so that the air supply passage communicates with the air discharge passage.

3. The method of claim 1, wherein the nozzle further includes a side wall having a projecting tab and the housing further includes a slot, and positioning the nozzle adjacent to the nozzle mounting surface further comprises registering the tab in the slot to align the nozzle on the nozzle mounting surface.

4. The method of claim 1, wherein the nozzle further includes a side wall having a projecting tab and the nozzle clamping and ejecting lever further includes a slot, and positioning the nozzle adjacent to the nozzle mounting surface further comprises registering the tab in the slot to align the nozzle on the nozzle mounting surface.

5. The method of claim 4, further comprising:

engaging the projecting tab with the nozzle clamping and ejecting lever while pivoting the nozzle clamping and ejecting lever to the second position.

6. The method of claim 1, wherein the dispensing valve further includes a fastener, and wherein the method further comprises:

moving the fastener to clamp the nozzle clamping and ejecting lever in the first position; and moving the fastener to permit the nozzle clamping and ejecting lever to pivot to the second position.

7. The method of claim 6, wherein moving the nozzle clamping and ejecting lever with the fastener further comprises:

rotating the fastener.

8. The method of claim 1, wherein:

the nozzle includes first and second oppositely disposed sidewalls, a first tab extending from the first sidewall, and a second tab extending from the second sidewall;

the nozzle clamping and ejecting lever includes a first slot;

the housing includes a second slot proximate the nozzle mounting surface; and wherein positioning the nozzle adjacent the nozzle mounting surface further comprises engaging the first tab in registration with the first slot and engaging the second tab in registration with the second slot to align the nozzle on the nozzle mounting surface.

9. The method of claim 8, further comprising:

contacting the first tab with the nozzle clamping and ejecting lever during pivoting to the second position to move the nozzle away from the nozzle mounting surface.

10. The method of claim 8, wherein the dispensing valve further includes a fastener, and wherein the method further comprises:

moving the fastener to clamp the nozzle clamping and ejecting lever in the first position; and moving the fastener to permit the nozzle clamping and ejecting lever to pivot to the second position.

* * * * *